United States Patent

[11] 3,614,199

| [72] | Inventor | Gerald Altman<br>41 Westminster Road, Newton Centre,<br>Mass. 02159 |
|---|---|---|
| [21] | Appl. No. | 742,423 |
| [22] | Filed | July 3, 1968 |
| [45] | Patented | Oct. 19, 1971 |

[54] REFLEX REFLECTING PRODUCTS, PROCESSES AND DEVICES USEFUL WITH SUCH PRODUCTS
4 Claims, 7 Drawing Figs.

[52] U.S. Cl............................................. 350/105, 350/126
[51] Int. Cl............................................. G02b 5/12
[50] Field of Search............................. 350/103-109

[56] References Cited
UNITED STATES PATENTS

| 2,555,715 | 6/1951 | Tatum | 350/105 |
| 1,902,440 | 3/1933 | Gill | 350/105 X |
| 2,294,930 | 9/1942 | Palmquist | 350/105 |
| 2,326,634 | 8/1943 | Gebhard et al. | 350/105 |
| 2,592,882 | 4/1952 | Fisher et al. | 350/105 |
| 2,713,286 | 7/1953 | Taylor | 350/105 |
| 3,388,027 | 6/1968 | Altman | 350/104 X |
| 3,430,375 | 3/1969 | Altman | 350/105 UX |

Primary Examiner—David Schonberg
Assistant Examiner—Michael J. Tokar
Attorney—Morse, Altman & Oates

ABSTRACT: Special purpose reflex reflecting sheets are characterized by closely packed refracting microspheres and interspersed pigment particles, both of which are held in fixed optical relation to a metallic reflecting stratum by a thin adhesive stratum. In one form, the product is designed to return light without substantial diffusion when its angle of incidence is approximately normal and to return light with substantial diffusion when its angle of incidence is substantially oblique. This product is particularly useful for the combined purposes of direct viewing in terms of diffuse light controlled by the pigment and of episcopic projection onto a viewing screen in terms of directed light controlled by the metallic reflecting stratum.

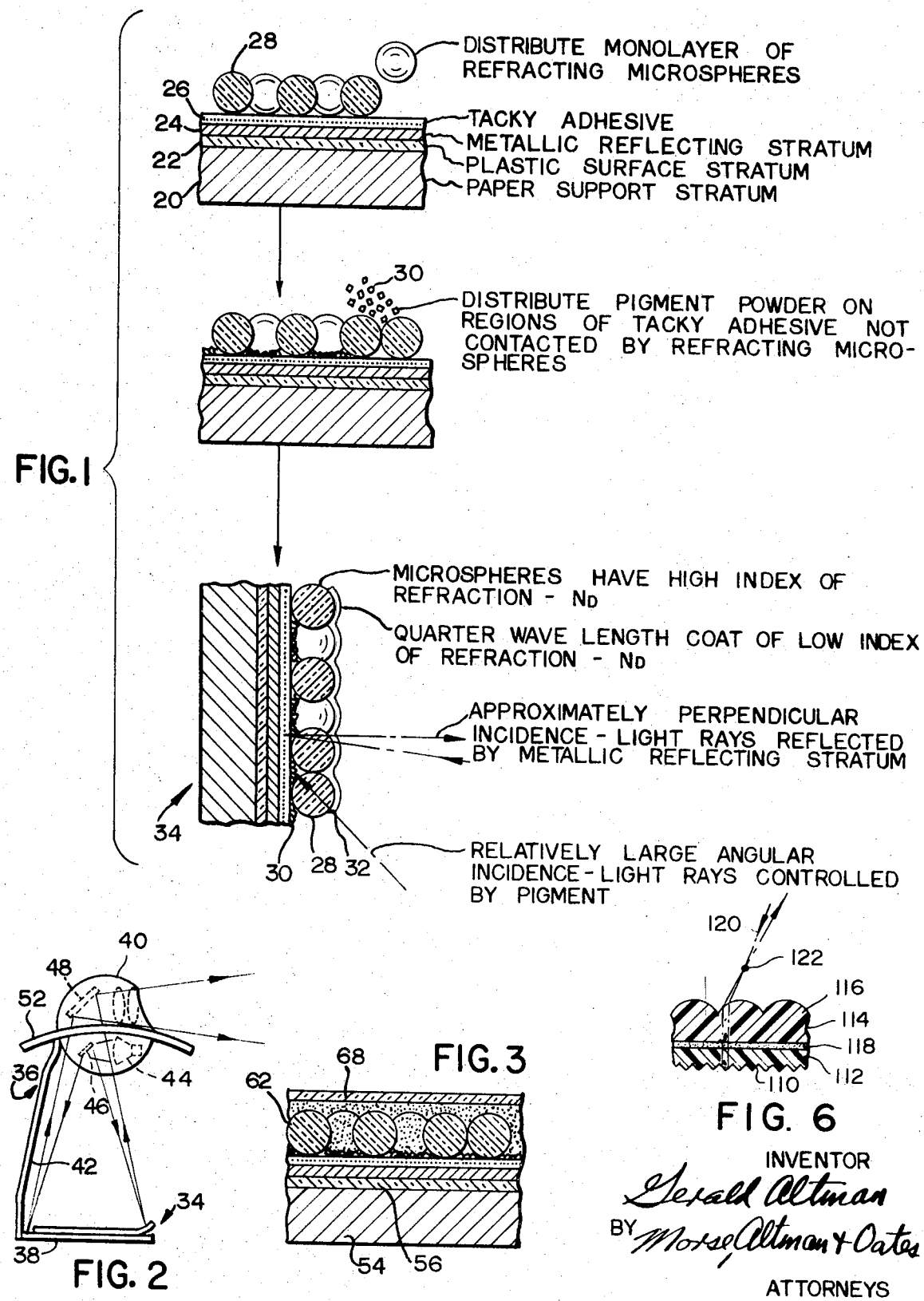

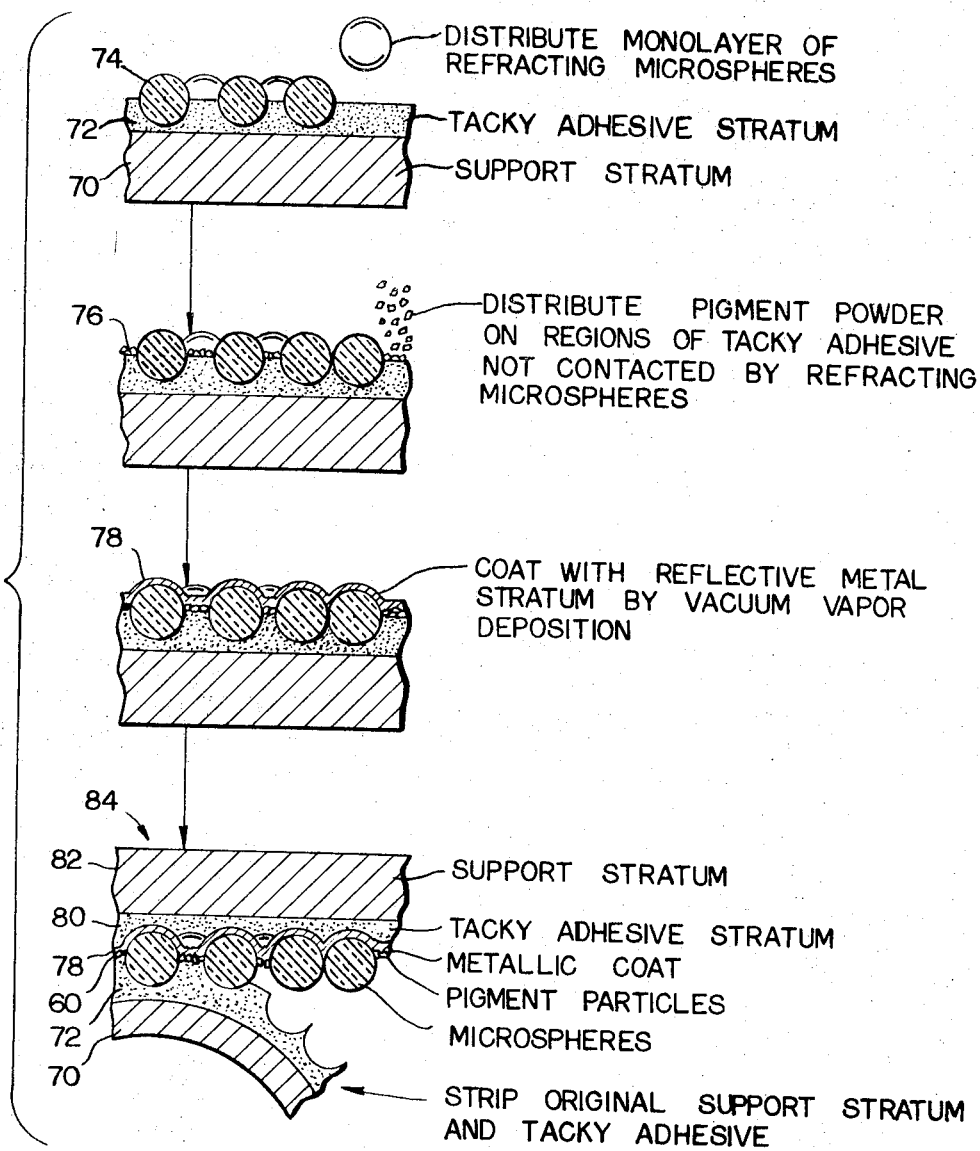
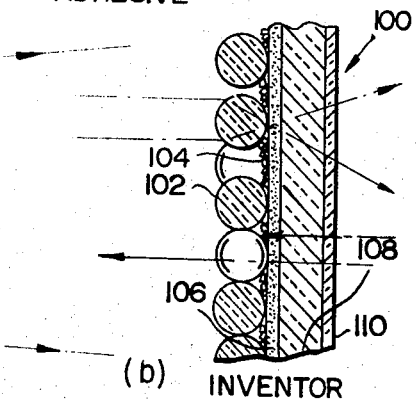
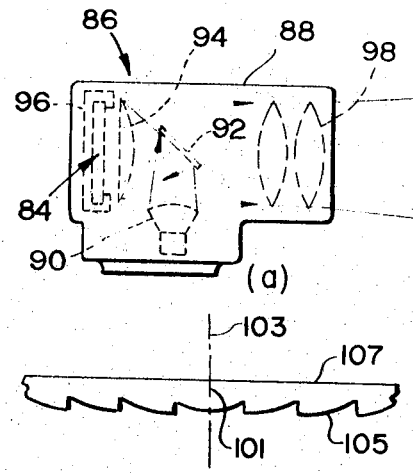
FIG. 5(a)

3,614,199

REFLEX REFLECTING PRODUCTS, PROCESSES AND DEVICES USEFUL WITH SUCH PRODUCTS

BACKGROUND AND SUMMARY

The present invention relates to the presentation of visual images and, more particularly, to the presentation of visual images for direct observation and episcopic projection. Conventionally, presentations intended for direct observation have been characterized by an opaque background that diffuses light to provide a so-called Lambertian flux distribution which is unsuitable for projection (episcopic) onto a viewing screen. On the other hand, presentations intended for projection have been characterized by a transparent support through which condensed light may be directed for projection (diascopic) onto a viewing screen but which is unsuited for direct observation because of an inability to adequately reflect random light. In other words, diascopic representations generally reflect too little light for convenient direct viewing and episcopic representations generally cannot maintain needed directivity of condensed light for effective projection.

The primary object of the present invention is to produce a reflex reflective product that is adapted for both direct observation and episcopic projection by reason of a reflex reflecting stratum which includes a stratiform laminate of refracting microspheres and a stratiform laminate of pigment particles and a thin reflecting metallic backing for the refracting microspheres, the thickness of the stratiform laminate of pigment particles being a small fraction of the thickness of the stratiform laminate of refracting microspheres. In one form, this reflex reflecting stratum enables rays of relatively large angular incidence to be reflected in a controlled cone and rays of small angular incidence to be returned in a diffused condition. In another form, the microspheres and pigment particles are positioned initially by the optically clear adhesive stratum in order to enable the establishment of correct optical relationships with respect to a metallic coat that thereafter is produced by vacuum vapor deposition.

Another object of the present invention is to provide, for use with a product of the foregoing or like type, a novel projection system in which illuminating light is directed along an axis to a visual representation from a light source via a relatively restricted angular mirror, and imaging light is returned from the visual representation along the axis for projection by a lens, the mirror and the lens being optically related in such a way as to ensure that maximum illuminating light flux is incident on the mirror from the source and minimum imaging light flux is incident on the mirror from the visual presentation.

Other objects of the present invention will in part be obvious and will in part appear hereinafter.

The invention accordingly comprises the products, processes and devices, which are exemplified in the following disclosure, the scope of which will be indicated in the appended claims.

DETAILED DESCRIPTION OF THE DRAWINGS

For a fuller understanding of the nature and objects of the present invention, reference is made to the following detailed description, taken in connection with the accompanying drawings, wherein:

FIG. 1 is a flow diagram, illustrating, in exaggerated cross section, materials undergoing a process for producing a product in accordance with the present invention;

FIG. 2 is an overhead projector that is adapted for imaging reflex reflecting and other directively reflecting materials;

FIG. 3 is an exaggerated cross sectional view of a photographic product embodying the present invention;

FIG. 4 is a flow diagram, illustrating, in exaggerated cross section, materials undergoing an alternative process for producing an alternative product in accordance with the present invention;

FIG. 5 illustrates a novel photographic projector and a novel rear viewing screen, both constructed in accordance with the present invention; and FIG. 6 is an exaggerated cross-sectional view of a special product useful with the projectors of FIGS. 2 and 5.

DETAILED DESCRIPTION

FIG. 1 illustrates the production process for a special purpose reflex reflecting sheet which reflects rays of relatively normal incidence in a controlled cone and reflects rays of relatively oblique incidence in a diffuse condition. In accordance with this process, first a paper support stratum 20 is coated with a smooth plastic face stratum 22 and the plastic face stratum is coated with a smooth, metallic reflecting stratum 24, for example, by vacuum vapor deposition. Next a planar tacky adhesive stratum 26 is laminated to the metallic reflecting stratum. Next a monolayer of refracting microspheres 28 is deposited by spreading a supply of microspheres in contact with tacky adhesive stratum 26 and the excess of unadhered microspheres is brushed form the newly formed microsphere surface. Next a monolayer of pigment powder particles 30 is deposited in the interstices of the refracting microspheres in contact with tacky adhesive stratum 26 and the excess of unadhered pigment particles is brushed from the newly formed, reticulated pigment particle surface. As shown at 32, finally and optionally, an antireflection coating is applied to the outer surface of the refracting microspheres. In an alternative embodiment, antireflection coating 32 is eliminated, and the microspheres are characterized by an inner spherical core of high refractive index and an outer thin shell of low refractive index. The outer thin shell, which has been produced by chemical treatment is less than ¼ wavelength in thickness. In one example of this modification, the inner spherical core has an index of refraction ($N_D$) of 1.9 and the outer thin shell has an index of refraction ($N_D$) of 1.5. Such microspheres are shown in U.S. Pat. No. 2,713,286 issued in the name of Nelson W. Taylor issued on July 19, 1955 for Reflex Light Reflectors And Glass Bead Elements Thereof. In a further modification, chemically treated microspheres of the foregoing type are combined with an antireflection stratum of the type shown at 32 to produce further minimization of reflection.

Details of the materials of the strata of the reflex reflecting sheet of FIG. 1 are as follows. Base stratum 20 is composed of paper, i.e. a felted sheet of cellulosic fibers, as indicated above. Alternatively, stratum 20, is composed of a plastic, for example, a cellulosic polymer such as cellulose nitrate, cellulose propionate or cellulose butyrate. Where base stratum 20 is composed of paper, plastic face stratum 22 is composed of one of the polymeric materials just described. Generally the combined thickness of support stratum 20 and face stratum 22 is within the range from 0.5 mil to 5 mils. If base stratum 20 is composed of paper, face stratum 22 preferably is within the range from 0.1 to 1.0 mil and base stratum 20 assumes the remaining thickness. Tacky adhesive stratum 24, for example, is composed of a natural latex dispersion in a nondrying solvent which incorporates a plasticizer. Such a tacky adhesive stratum, in one form, is a pressure-sensitive adhesive material of the type used in pressure sensitive tape sold under the trade designation "Scotch" tape by Minnesota Mining and Manufacturing Company, St. Paul, Minnesota. In the case of FIG. 1, this tacky adhesive stratum is extremely thin, ranging in thickness from 0.5 to 10 microns. Metal reflecting stratum 24, which preferably is composed of silver or aluminum, ranges in thickness from 500 to 1,500 Angstrom units.

Preferably, the microspheres, which are composed of glass, are within the range from 1 to 50 microns in diameter. It is preferred that the index of refraction of the microspheres be within the range of 1.8 to 2.2 and, most advantageously, within the range of 1.9 to 2.1, in which case a ray entering one side of a microsphere is focused approximately on the apex at the other side. The area concentration of the microspheres is maximized to achieve a covering power preferably of at least 90 percent of the surface area of the reflex reflecting sheet, there being a range of larger microspheres which are virtually in contact with each other, i.e. no more than 10 percent of their average diameter apart, and a range of smaller microspheres which cover the interstices defined by three of more larger microspheres. Generally the pigment particles are within the range of less than 10 microns in maximum diameter, preferably submicron in maximum diameter. In order to permit the pigment particles to flow freely into the interstices among the refracting microspheres, the maximum diameters of the pigment particles are chosen to be no greater than 25 percent of the minimum diameters of the refracting microspheres. Thus the thickness of the reticulated stratiform laminate composed of the pigment particles generally is no greater than 25 percent of the thickness of the stratiform laminate composed of the refracting microspheres.

In one form pigment particles 30 are composed of titanium dioxide or the like which is optically clear and which commonly serves as a white pigment in consequence of its ability to scatter incident white light. In another form, particles 30 are composed of carbon, graphite or the like which commonly serve as black pigment in consequence of their ability to absorb incident light. Where pigment particles 30 are white, incident rays that are approximately normal to reflex reflecting sheet 34 are reflected in a narrow cone, the axis of which is approximately normal to the reflex reflecting sheet, and incident rays that are relatively oblique impinge on the white pigment powder so as to become diffusely reflected. On the other hand, when pigment particles 30 are black, rays of substantially normal incidence again are strongly reflected and rays that are relatively oblique are absorbed by the black particles. Thus, the pigment particles form a microscopically reticulated grid that provides minute optically clear regions to serve as apertures, through which rearward apices of the microspheres communicate with reflecting metal stratum 24, and optically opaque regions to serve as shielding, by which other portions of the microspheres are obscured from communication with reflecting metal stratum 24.

In one example, support stratum 20, is baryta paper approximately 1.0 mil thick, face stratum 22 is ethyl cellulose approximately 0.5 mil thick, metallic stratum 24 is aluminum approximately 800 Angstroms thick, and tacky adhesive stratum 26 is a rubber cement, including natural rubber and naphthalene, approximately 0.5 micron thick.

The overhead projector of FIG. 2 is designed for use with the modification of reflex reflecting sheet 34, in which pigment 30 is black. This projector comprises an upper housing 40 containing optical projection and illumination components and lower platen 38 for supporting reflex reflecting sheet 34, the housing being supported above the platen by a post 42. A shade 52, which extends outwardly in all directions from housing 40, is provided to shield the eyes of a user from light reflected by reflex reflecting sheet 34. Shade 52, for example, is composed of a tinted plastic sheet which absorbs in excess of 75 percent of all light directed through it.

The operating components within housing 40 include a source of illumination 44 having an incandescent filament and an ellipsoidal mirror, at one of the foci of which the incandescent filament is positioned. Also included are: a small 45° mirror 46 which is positioned at the other of the foci of the ellipsoidal mirror for directing illuminating light to reflex reflecting sheet 34; an upper 45° mirror 48, which is substantially larger than lower 45° mirror 46, for deflecting imaging light returned by reflex reflecting sheet 34; and an objective lens system 50 for projecting such imaging light onto a viewing screen or the like. The arrangement is such that the angle subtended by the cone of illuminating light at mirror 46 is considerably larger than the angle subtended by the cone of imaging light at mirror 46. In other words, the cross-sectional area of the cone of illuminating light at mirror 46 is considerably less, say at most approximately one-tenth of the cross-sectional area of the cone of imaging light at mirror 46 so that little imaging light is lost at mirror 46. Microspheres 28 are imbedded only sufficiently deeply in tacky adhesive 26 to ensure that rays of predeterminedly maximum obliquity are reflex reflected and remaining rays are not.

A modification of reflex reflecting sheet 34 of FIG. 1 is shown in FIG. 3 as comprising, in laminated sequence, a paper support stratum 54, a plastic face stratum 56, a metallic reflective stratum 58, a tacky adhesive stratum 60, a refracting microsphere-pigment particle stratum 62, 64, a tacky adhesive stratum 66 and a photographic stratum 68. Materials 54, 56, 58, 60, 62, 64 are similar to their counterparts in FIG. 1 at 20, 22, 24, 26, 28 and 30, powder 64 in this case being white. Here photographic stratum 68 in one form is photosensitive and in another form is developed following photoexposure. In one form photosensitive stratum 68 is a gelatino silver halide stratum of the type which may be processed by a developer such as hydroquinone and a fixer such as sodium thiosulfate. In other embodiments, the photosensitive material for example is: a ferric composition capable of being developed by potassium ferrocyanide; a diazo material capable of being developed by an alkali; a bichromated material capable of being differentially hardened and dyed; a photopolymerizable material capable of being differentially polymerized by incident light as in U.S. Pat. No. 2,948,611, issued on Aug. 9, 1960 in the name of Arthur L. Barney for Photopolymerizable Composition, Elements And Processes; a photothermographic material capable after exposure of being developed by heat, as in U.S. Pat. No. 2,095,839, issued on Oct. 12, 1967 in the name of Samuel E. Sheppard et al. for Photothermographic Compositions; a phototropic material capable of being differentially darkened by light without development, as in U.S. Pat. No. 2,953,454, issued on Sept. 20, 1960, in the name of Elliot Berman for Phototropic Data Storage Capsules And Base Coated Therewith; or a photoconductive material capable of assuming a differential electrostatic charge pattern after being charged and developed by a cloud of developer material which adheres differentially to the charge pattern, such electrophotographic materials and steps being disclosed in U.S. Pat. No. 2,939,787, issued June 7, 1960 in the name of Edward C. Giaimo, Jr., for Exposure Of Photochemical Composition; and U.S. Pat. No. 2,993,787, issued July 25, 1961, in the name of Meyer K. Sugarman, Jr. for Electrostatic Printing.

The production of an alternative reflex reflecting sheet in accordance with the present invention is illustrated in FIG. 4. In accordance with process, first a base stratum 70 is coated with a tacky adhesive stratum 72 and a monolayer of microspheres 74 is distributed in contact with tacky adhesive stratum 72. Next sufficient pressure is applied to the monolayer in order to impress the microspheres into the tacky adhesive stratum to a depth at which approximately a hemisphere of each microsphere is free. Then a monolayer of pigment particles 76 is distributed at the interstices of the microspheres in contact with the free surface of tacky adhesive stratum 72. Next the exposed surfaces of microspheres 74 and pigment particles 76 are coated, for example, by a vacuum vapor deposition with a thin layer of metal 78, for example, composed of aluminum or silver, ranging in thickness from 500 to 1,500 Angstrom units. Finally the metallic coated surfaces of microspheres 74 and pigment particles 76 are contacted under pressure by a transfer sheet, which includes a base stratum 82 and an adhesive stratum 80. Adhesive stratum 80 produces a considerably more powerful bond than tacky adhesive stratum 72 so that strata 70, 72 can be stripped as a sheet from the remainder of the assemblage in order to leave a reflex reflecting sheet 84, which is characterized by powerful reflex reflectivity throughout a wide angle. In other word, a ray of light incident upon sheet 84 at any of a wide range of angles results in a reflex reflected cone, the solid angle of which in magnitude is determined by the index of refraction of the microshperes. On the other hand, a ray of light incident upon pigment particles 76 is absorbed if these pigment particles are black or diffusely reflected if these pigment particles are white.

The materials of base strata 70, 82, adhesive strata 72, 80, microspheres 74, pigment particles 76 and metallic stratum 78 are analogous in all respects to the corresponding materials discussed above in connection with FIG. 1. Specifically, in order to achieve proper stripping of strata 72, 70 from the remainder of the assemblage, adhesive stratum 72 in one form ranges from 0.1 to 1 micron in thickness and adhesive stratum 80 in one form ranges from 5 to 25 microns in thickness.

A projector for use in connection with the products of FIGS. 1 and 4 is shown in FIG. 5 as comprising a housing 86, within which the operating components are affixed and contained. These operating components include an illumination source 90 in the form of an incandescent lamp having an incandescent filament and a reflector which is ellipsoidal in configuration. The incandescent filament is located at one of the foci of the ellipsoidal reflector. At the other of the foci of the ellipsoidal reflector is a 45° mirror 92 by which light generated by lamp 90 is deflected along an axis toward reflex reflecting presentation 84, which is carried by a suitable holder 96. In the path between mirror 92 and representation 84 is a lens 94, which is contiguous with reflex reflecting presentation 84 and which collimates light deflected from lamp 90 by 45° mirror 92. This illuminating light is returned by reflex reflecting representation 84 as imaging light which is directed toward objective lens 98 for projection onto a viewing screen 100. It will be noted that the cross-sectional area of the imaging light in the vicinity of mirror 92 is greater than the cross-sectional area of illuminating light in the vicinity of mirror 92 so that little imaging light is lost by reflection at mirror 92. Generally, the cross-sectional area of the imaging light in the vicinity of mirror 92 is at least 10 times as great as the cross-sectional area of the illuminating light in this vicinity.

It will be understood that, in the devices of both FIGS. 2 and 5, the reflex reflecting sheet may serve only as a reflecting backing and a removable transparent plastic overlay may incorporate the representation. Also, in modifications of FIGS. 2 and 5, the reflex reflecting sheet includes minute corner reflectors, each characterized by three intersecting facets which are slightly greater than or slightly less than 90° apart. In other modifications of the projectors of FIGS. 2 and 5, the illustrated reflex reflecting sheets are replaced by a Fresnel mirror the focal distance of which is chosen to just fill the aperture of the objective lens with light. One such Fresnel reflector is described in U.S. Pat. No. 3,340,765, issued Sept. 12, 1967 in the name of Donald R. Herriot for Projection System. As shown in FIG. 5(a), the center of Fresnel mirror 101 is on an axis 103, which extends through the lamp filament and the mirror aperture. The grooves of lower surface 105 are in the form of concentric conoidal rings, grossly exaggerated in the drawing for clarity, each representing a segment of a spherical surface having a given center of curvature. The upper surface 107 is flat for receipt of a transparent representation for projection.

In the form shown, viewing screen 100 is a rear projection screen which comprises in laminated sequence, a microsphere monolayer 102, a pigment particle monolayer 104, a tacky adhesive stratum 106, a transparent plastic support stratum 108 and an antireflection stratum 110. Preferably microspheres 102 are sufficiently small and closely packed to avoid optical graininess, ranging from 1 to 50 microns in diameter and preferably covering at least 90 percent of the area of the product. Preferably pigment particles 104 are black and have maximum dimensions no greater than 1/10th of the minimum dimensions of microspheres 102.

Preferably the indicies of refraction of microspheres 102, tacky adhesive stratum 106 and transparent plastic support are closely similar. All of the materials and dimensions of these components correspond to analogous materials and dimensions of the reflex reflecting sheet of FIG. 1. Specifically, the microspheres have an index of refraction ranging from 1.8 to 2.2, the adhesive tacky adhesive 106 has an index of refraction of approximately 1.6 and the index of refraction of transparent plastic base 108, which may be composed of styrene, is approximately 1.8. Antireflection stratum 100 is a quarter wave length coat of a material having an index of refraction of approximately 1.4. In operation, most of the area presented to an incident light beam is provided by free surfaces of microspheres 102, each of which serves as a lens to focus all light incident upon it at a point which is adjacent to the apex of its inner surface, the resulting rays diverging in an amount which is controlled by the index of refraction of the microspheres.

FIG. 6 illustrates a modification of the product of FIG. 1, which is produced by a process analogous to the process of FIG. 1. This product comprises a rearward plastic sheet 110, which has a multiplicity of reflex reflective cube corners 112, 110 embossed on its rearward surface, and a forward plastic sheet 114, which has a multiplicity of refracting lenses embossed on its forward surface. The two sheets are laminated together by a suitable adhesive 118, which is of the same index of refraction of both of the sheets so that internal reflection within the composite sheet is eliminated. Lenses 116 are much larger in diameter than cube corners 110, say at least five times larger, so that a ray 120 emanating from a point 122 on the focal plane of a lens 116, after being first refracted by the lens, next reflex reflected by cube corners 110 and again refracted by the lens, will again intersect point 122. This construction has application where the visual representation to be imaged is on a transparent overlay that is to be placed upon the product of FIG. 6 when in use in the projection of either FIG. 2 or FIG. 5.

The present invention thus provides products, processes and devices for utilizing closely packed microspheres, which although sufficiently small to be unresolvable by the human eye, are sufficiently great in comparison with pigment particles to serve an optical control function, both the microspheres and the particles being maintained in predetermined optical relation by a thin transparent adhesive stratum. Since certain changes may be made in the foregoing disclosure without departing from the scope of the invention herein involved, it is intended that all matter contained in the foregoing description or shown in the accompanying drawing be interpreted in an illustrative and not a limiting sense.

What is claimed is:

1. A reflective product comprising, as discrete laminations, a plastic base stratum, a metallic reflecting stratum, an optically clear adhesive stratum, and a reticulated control stratum, said reticulated control stratum including a distribution of relatively large light-refracting microspheres and a distribution of relatively small light-occluding particles, said light-refracting microspheres having inward portions directly retained by first increments of said adhesive stratum in optical communication with and spaced relation from said metallic reflecting stratum, said light-occluding particles being retained second increments of said adhesive stratum in the interstices among said light-refracting microspheres, said light-occluding particles at said second increments constituting an opaque mask, said second increments constituting minute windows in said opaque mask in registration with said microspheres, the face of said plastic base stratum adjacent to said metallic reflecting stratum being smooth and said metallic reflecting stratum being vapor deposited thereon, said metallic reflecting stratum being selected from a member of the class consisting of silver and aluminum and being at most 1,500 Angstrom units thick.

2. The reflective product of claim 1 wherein said clear adhesive stratum is pressure sensitive.

3. A reflective product comprising, as discrete laminations, a plastic base stratum, a metallic reflecting stratum, an optically clear adhesive stratum, and a reticulated control stratum including a distribution of relatively large light-refracting microspheres and a distribution of relatively small light-occluding particles, said light-refracting microspheres having inward portions directly retained by first increments of said adhesive stratum in optical communication with and spaced relation from said metallic reflecting stratum, said light-occluding particles being retained by second increments of said adhesive stratum in the interstices among said light-refracting microspheres, said light-occluding particles at said second increments constituting an opaque mask, said second increments constituting minute windows in said opaque mask in registration with said microspheres, said face of said plastic base stratum adjacent to said metallic reflecting stratum being smooth and said metallic reflecting stratum being vapor deposited thereon, said metallic reflecting stratum being composed of a member of the class consisting of silver and aluminum, and ranging in thickness to at most 1,500 Angstrom units.

4. The reflective product of claim 3 wherein the areas of said inward portions of said microspheres are smaller than hemispheres, outward portions of said microspheres being ambiently exposed, said outward portions being larger than hemispheres, and portions of said opaque mask bounding said optical apertures being disposed between portions of said metallic reflecting stratum and portions of said microspheres, the index of refraction of said microspheres being such as to cause focusing of relatively normally incident light rays at said inward portions of said microspheres onto said metallic relatively stratum for specular reflection and to cause focusing of relatively obliquely incident light rays at said outward portions of said microspheres onto said occluding particles for diffuse reflection.